United States Patent [19]

Rosenberg et al.

[11] 4,011,730
[45] Mar. 15, 1977

[54] GELLED CRYOGENIC LIQUIDS AND METHOD OF MAKING SAME

[75] Inventors: Sanders D. Rosenberg, Sacramento; Eugene M. Vanderwall, Citrus Heights, both of Calif.

[73] Assignee: Aerojet-General Corporation, El Monte, Calif.

[22] Filed: Apr. 28, 1975

[21] Appl. No.: 572,240

Related U.S. Application Data

[63] Continuation-in-part of Ser. No. 36,416, May 11, 1970, abandoned.

[52] U.S. Cl. .............................. 62/1; 23/295 G; 44/7 D; 44/52; 48/196 FM; 62/48; 206/568; 252/70

[51] Int. Cl.[2] .......................................... F25C 3/00

[58] Field of Search ................ 62/1, 8, 10, 45, 48, 62/55, 66, 77; 23/295 G; 44/7 D, 52; 252/67, 70, 316; 206/84; 48/196 FM, 197 FM

[56] References Cited

UNITED STATES PATENTS

| 1,726,018 | 8/1929 | Farrar | 62/48 X |
|---|---|---|---|
| 2,938,779 | 5/1960 | Kolfenbach et al. | 44/7 D |
| 3,393,152 | 7/1968 | Smith et al. | 252/67 |
| 3,634,050 | 1/1972 | Corino et al. | 44/7 D |

Primary Examiner—Ronald C. Capossela
Attorney, Agent, or Firm—J. Georg Seka; John L. McGannon

[57] ABSTRACT

A novel cryogenic liquid composition comprising liquid methane and/or natural gas and an effective gelling amount of a gelling agent therefor, comprising finely divided ice particles or finely divided methyl alcohol particles.

20 Claims, 1 Drawing Figure

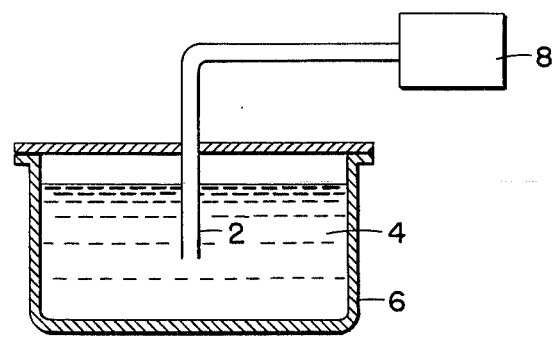
FIG._1.

4,011,730

GELLED CRYOGENIC LIQUIDS AND METHOD OF MAKING SAME

RELATED APPLICATIONS

This patent application is a continuation-in-part application of the co-pending U.S. Pat. application bearing Ser. No. 36,416, filed May 11, 1970, for INHIBITION OF GAS SOLUBILIZATION IN CRYOGENIC LIQUIDS, now abandoned.

BACKGROUND OF THE INVENTION

This invention relates to cryogenic liquids and a method for gelling such liquids to inhibit the solubilization of foreign gases therein and to enhance the shipping and storage characteristics of the gelled liquid as contrasted with the characteristics of the ungelled liquid.

Cryogenic compositions are normally stored and shipped under atmospheric pressure; they are also sometimes moved in closed systems under the pressure of so-called pressurant gases. In the latter instance, these gases are of necessity in contact with the surface of the cryogenic liquid. Unfortunately, most if not all of the otherwise suitable pressurant gases exhibit a rather substantial solubility in cryogenic liquids. This solubility is undesirable for many reasons, the principal reason being that the pressurant gases represent an inert diluent which diminishes the desired properties of the cryogenic liquid. The solubility of normal pressurant gases in cryogenic liquids is high and it has not been possible to reduce the equilibrium solubility values without altering temperature and pressure.

SUMMARY OF THE INVENTION

It has now been found to be possible to reduce the rate of solubilization of pressurant gases in the cryogenic liquids. It has been found that diffusion is the slowest dissolution mechanism available and the solubilization rate can be made to follow the diffusion mode of dissolution by producing an adequate gel structure in the cryogenic liquid. Therefore by gelation of the cryogenic liquids, the solubilization rate of the pressurant gas can be reduced to a minimum without altering the normal operational temperature and pressure. Specifically, we have found that the solubility of nitrogen or air pressurant gases in liquid methane can be reduced from about 10 weight percent at one atmosphere partial pressure of nitrogen to practically zero using less than 2 weight percent gelant.

In another aspect of the invention, the gelation of the liquid reduces its sloshing when it is in moving tanks, such as ocean-going transport vessels or in aircraft fuel tanks, and assists in maintaining the positional stability of the fuel. The structure a gel possesses when at rest gives the material the properties of a coherent semisolid. Consequently, until a shear force is applied, the material will remain in its original position.

Thus, when large bodies of the gelled liquid, say, gelled liquefied natural gas are transported in transport vessels, the actual sloshing of the mass is greatly reduced. This aids in stabilizing the vessel. Furthermore, even if some sloshing does occur, the gelled material dampens out and takes its rest position much more rapidly than an equal body of ungelled liquid in the same container. Thus, the gelation of liquid for ocean transport can materially simplify design requirements for the vessel.

A still further aspect of the use of gelled liquefied methane and/or gelled liquefied natural gas is its better heat transfer characteristics. The low temperature of cryogenic materials makes it necessary to insulate and prevent heat transfer to limit the amount of liquid that "boils off." Since the heat transfer rate is much more rapid in a liquid than in a solid, the gelled liquid has a lesser heat transfer rate than the liquid. Thus, the cryogenic, gelled liquid takes up less heat from the surrounding atmosphere and therefore requires less insulation without increasing the boil off, or, conversely, has less boil off with a like amount of insulation. The present invention therefore achieves cost savings in the storage and transport of low temperature liquefied methane and/or natural gas.

Another advantage achieved from gelling liquefied methane and/or liquefied natural gas is its reduced flow or its increased viscosity. In the event a storage tank or shipping vessel leaks or ruptures the flow-out of the gelled liquid is reduced and the size of the pool formed by the escaping gelled liquid is much smaller than a pool formed by an escaping ungelled liquid. The reduction in the pool size limits the resulting methane and/or natural gas cloud forming over the pool and thereby limits both the fire hazard and the pollution of the environment. Thus, the present invention renders the storage and shipping of liquefied methane and/or natural gas substantially less hazardous.

Briefly, the present invention comprises a novel liquid cryogenic composition, and methods of making, and shipping and storing such a composition, comprising liquid methane and/or natural gas (hereinafter sometimes collectively referred to as "gelled liquid") and an effective gelling amount of a gelling agent thereof, preferably comprising finely divided ice particles or finely divided methyl alcohol particles. The invention further comprises the reduction and control of the solubility of pressurant gases (where such gases are present) in liquid methane and/or natural gas by the gelling of said methane; the enhancing of the shippping and storage characteristics of the gelled liquid; and a reduction in the rate with which the gelled liquid absorbs heat.

The gelling agent is generally employed in an amount of from about 0.1 percent to 3.0 percent by weight of the cryogenic liquid.

It is an object of our invention to provide a novel gelled cryogenic liquid composition.

More specifically, it is an object of this invention to provide a novel gelled liquid methane and/or natural gas composition.

Still more specifically, it is an object of our invention to control the solubility of pressurant gases in liquid methane and/or natural gas by the incorporation therein of an effective gelling amount of finely divided ice particles or finely divided methyl alcohol particles to transform such liquids into gelled liquids, and to enhance the storage, shipping and heat transfer characteristics of the gelled liquid as contrasted with normal liquefied methane and/or natural gas.

These and other objects and advantages of this invention will be apparent from the more detailed description which follows.

BRIEF DESCRIPTION OF THE DRAWING

The drawing FIGURE schematically illustrates a vessel holding liquefied natural gas and/or methane and apparatus for injecting a gelling agent constructed in accordance with the present invention.

DESCRIPTION OF THE PREFERRED EMBODIMENTS

Referring to the drawing, in the preferred form of the present invention, the method used for the preparation of small particles of ice involves the dilution of the candidate gelant vapor, such as water vapor, with an appropriate carrier gas, such as helium or methane in a gelant source 8, followed by injection of the gaseous mixture through a suitably heated tube 2 and orifice directly into a cryogenic liquid 4 in a container 6 such as a tank or an ocean vessel so that condensation occurs immediately within the bulk of the liquid, forming particles of the proper size to produce a gel. The direct dispersion of the particles in the liquids avoids the condensation of particles on the walls of the vessel and eliminates the necessity of additional mixing normally required to produce a gel.

Alternatively, under appropriate circumstances, the jelling agent, that is the water vapor or methyl alcohol, can be injected in its gaseous form without providing a carrier gas. In all other respects, however, the method remains the same. Thus, the gaseous gelling agent is passed through a suitable tube and orifice into the cryogenic liquid to assure its condensation within the bulk of the liquid and a proper particle size and particle distribution.

Three batches of gelled liquid methane were prepared; three gelant concentrations were used. The appearance of the gels varied with gelant concentrations from a semi-opaque solution containing a flocculent precipitate to a colloidal solution. The liquid appeared viscous in each case. However, the gel flowed as if it were liquid methane during the transfer from the gelling vessel to the storage vessel. This rapid shear-thinning under shear stress is typical for particulate gels.

The concentration of the gelant required was determined in two ways. First, the water reservoir was weighed before and after each experiment; the value calculated from the weighing corresponds to the upper limit of the concentration. Second, the residual water left in the storage vessel was weighed after the methane had evaporated from the flask in two of the experiments; this value represents the actual concentration. The upper limit values provides a basis from which to determine the capture ratio of the total water vapor injected into the liquid methane to the actual quantity of water captured by condensation in liquid methane. These data are presented in Table I.

TABLE I

WATER CONCENTRATIONS REQUIRED FOR GELATION OF METHANE AND CAPTURE RATIOS

| COMPOSITION NUMBER | WATER CONCENTRATION Weight Percent | | CAPTURE RATIO gm injected/gm recovered |
|---|---|---|---|
| | Measured | Upper Limit | |
| 1 | 1.63 | 9.2 | 6.1 |
| 2 | 1.25* | 4.0 | — |
| 3 | 1.02 | 3.2 | 3.2 |

*estimated value, based on Composition No. 3 Capture Ratio.

The significance of the above data is that adequate gel structure can be produced in liquid methane with less than 2 weight percent water as the gelant. When this experiment is repeated using 2 weight percent methyl alcohol particles as the gelant, similar results are obtained.

Two determinations of the solubilization rate of gaseous nitrogen in liquid methane were conducted. During the course of these tests, the nitrogen was readily solubilized and the convective nature of the process was evidenced by the Schlieren patterns observed in the liquid. In the first run at −280° F and after 105 minutes of contact with the nitrogen with a partial pressure of 15 psia, the liquid phase contained 11.2 weight percent nitrogen in the methane; in the second run at −280° F and after 105 minutes of contact with nitrogen at a partial pressure of 20 psia, the liquid contained 11.7 weight percent nitrogen. There is an extremely rapid increase in volume due to the dissolution of nitrogen initially, followed by a slower but steady rate of increase which continued until the runs were terminated. The data from the initial two runs provides the baseline data for comparison with the later runs.

The three methane gels previously discussed were then subjected to the same experimental procedures as the ungelled methane and the volume increase as a function of time was determined. As the gelant concentration is increased with an accompanying increase in gel structure, the rate of solubilization of gaseous nitrogen decreases significantly. Finally, with 1.6 percent $H_2O$ as gelant, there is no detectable solubilization of nitrogen in the liquid methane at −280° F with a partial pressure of 15 psia of nitrogen over the surface of the gel. At the same gelant concentration, with a nitrogen partial pressure of 20 psia, only 0.5 weight percent of nitrogen was present in the liquid phase. The data are presented in Table II.

TABLE II

QUANTITY OF NITROGEN DISSOLVED IN LIQUID METHANE AT −280° F AFTER ONE HOUR

| Run No. | Gelant Concentration Weight % | Initial Volume Of Liquid Methane (cc) | Partial Pressure of Nitrogen (psia) | Measure Volume Increase (cc) | Final Composition of Liquid Phase | |
|---|---|---|---|---|---|---|
| | | | | | Weight % Nitrogen | Volume % Nitrogen |
| 1. | 0.0 | 495.4 | 15 | 35.1 | 10.0 | 6.6 |
| 2. | 0.0 | 494.7 | 20 | 36.3 | 10.3 | 6.8 |
| 3. | 0.7* | 362 | 15 | 20.0 | 8.0 | 5.2 |
| 4. | 1.0 | 440 | 14 | 14.7 | 5.0 | 3.2 |

TABLE II-continued

QUANTITY OF NITROGEN DISSOLVED IN LIQUID METHANE AT −280° F AFTER ONE HOUR

| Run No. | Gelant Concentration Weight % | Initial Volume Of Liquid Methane (cc) | Partial Pressure of Nitrogen (psia) | Measure Volume Increase (cc) | Final Composition of Liquid Phase Weight % Nitrogen | Volume % Nitrogen |
|---|---|---|---|---|---|---|
| 5. | 1.6 | 275 | 15 | 0.0 | 0.0 | 0.0 |
| 6. | 1.6 | 275 | 20 | 0.9 | 0.5 | 0.3 |

*estimated value

Runs 5 and 6 were conducted with the same batch of gel. After no solubilization of nitrogen was detected in Run 5, the pressure in the ullage was reduced to less than the vapor pressure of methane and this caused the gel to boil and assured the removal of any dissolved nitrogen. The gel was then maintained at the vapor pressure of methane for sufficient time to allow temperature equilibrium to the contents to −280° F. Run 6 was initiated using a 20 psia partial pressure of nitrogen instead of 15 psia, as used in Run 5. A significant portion of the 0.9 cc volume increase measured in Run 6, may actually be due to the experimental errors in the measurement; temperature variation could lead to an 0.47 cc increase in volume.

These foregoing data show that, with sufficient gel structure present in the liquid methane, the solubilization rate of nitrogen in liquid methane is negligible and the required gel structure can be achieved with less than 2 weight percent gelant present in the methane. The solubilization rate of air in the gelled liquid methane and/or natural gas of this invention is also negligible.

The foregoing data was compiled under certain absolute pressures in the general vicinity of or slightly above atmospheric pressure. It is expressly noted, however, that these are not limiting pressures for the present invention. It is apparent that when the gelled liquid is shipped or transported in bulk, e.g., on ocean vessels, or in large bulk storage tanks, the gelled liquid will normally be under atmospheric pressure. In other instances it might be desirable to subject the gelled liquid to less than atmospheric pressure. Although under such conditions a greater amount of boil off is to be expected and the actual absorption rates of pressurant gas, if any is present at all, may vary slightly, the physical characteristics of the gelled liquid (other than changes in the gas absorption and/or boil off rate) remain the same and continue to give the above stated advantages relating to the shipping and storage of the gelled liquid and its beneficial gas absorption and heat transfer rates.

We claim:
1. A gelled cryogenic liquid composition consisting essentially of at least one of liquid methane and liquid natural gas and of a gelling agent taken from the class consisting of finely divided ice particles and finely divided methyl alcohol particles, the gelling agent being present in the range of 0.1 percent to 3.0 percent by weight of the liquid methane and liquid natural gas.

2. A gelled cryogenic liquid composition disposed in a vessel pressurized by a gas acting on a surface of the liquid, the composition consisting essentially of at least one of liquid methane and natural gas and of an effective gelling agent taken from the class consisting of small ice particles and small methyl alcohol particles distributed through the composition and being present in a concentration sufficient to cause gelling of the composition.

3. In combination a container, a liquid in the container consisting essentially of at least one of liquid methane and liquid natural gas, and of a gelling agent distributed through the composition, taken from the class consisting of small ice particles and small methyl alcohol particles, and added to the liquid in the tank in an amount sufficient to gel the liquid.

4. The combination of claim 3 wherein the liquid partially fills the container and including gas filling a remainder of the container and contacting a surface of the liquid.

5. The combination of claim 4 wherein the gas is at atmospheric pressure.

6. The combination of claim 4 wherein the gas is at super atmospheric pressure.

7. The combination comprising means defining a tank, a cryogenic mass of at least one of liquid methane and liquid natural gas in the tank means and of a gelling agent added to the mass and taken from the class consisting of finely divided ice particles and finely divided methyl alcohol particles, the gelling agent being present in the range of 0.1 percent to 3.0 percent by weight of the mass.

8. The combination according to claim 7 wherein the tank means comprises portable tank means.

9. The combination according to claim 8 wherein the portable tank means comprises an ocean vessel.

10. The combination according to claim 7 wherein the tank means comprises a stationarily mounted storage tank.

11. A gelled cryogenic liquid composition adapted to be used and held in a receptacle consisting essentially of a mass of at least one of liquid methane and liquid natural gas with an effective gelling agent added thereto to reduce the solubility of gas contacting the mass in the liquid methane and natural gas, wherein the gelling agent is taken from the class consisting of finely divided ice particles and finely divided methyl alcohol particles, and wherein the gelling amount of the gelling agent is in the range of 0.1 percent to 3.0 percent by weight of the cryogenic liquid, and wherein the gelling agent is injected in the form of a gaseous mixture through a heated tube directly into the body of the mass of liquid methane and the natural gas so that condensation occurs immediately within the bulk thereof to form particles of the proper size to produce said gel and to avoid condensation of particles on the walls of the vessel and to eliminate additional mixing normally required to produce a gel.

12. A novel gelled cryogenic liquid composition adapted to be used and held in a receptacle consisting essentially of a mass of at least one of low temperature liquid methane and low temperature liquid natural gas, and a gelling agent added thereto in an amount of between 0.1 percent to 3.0 percent by weight of the cryogenic liquid, the gelling agent being taken from the class consisting of evenly distributed and finely divided ice particles and methyl alcohol particles and wherein the gelling agent is injected in its gaseous form directly into the body of the mass of liquid methane and natural gas so that condensation of the gelling agent occurs immediately within the bulk of the mass and forms low temperature, solid particles of a sufficiently small size to produce the gel.

13. A method of gelling low temperature, liquified methane and low temperature, liquified natural gas to reduce the solubility of pressurant gases acting on the methane and natural gas and to alter the physical characteristics of the mass for storage and shipping, the method comprising the steps of cooling at least one of the methane and the natural gas sufficiently to liquify it, injecting a gaseous gelling agent selected from the class consisting of water vapor and methyl alcohol gas into the interior of the liquified methane and natural gas to thereby cool and solidify the gelling agent particles while distributing the particles throughout the liquid mass.

14. A method according to claim 13 including the step of injecting gelling agent in an amount ranging from between about 0.1 percent to about 3.0 percent by weight of the liquified methane and natural gas.

15. A method according to claim 14 wherein the step of injecting includes the step of providing a heated tube having an orifice directed into the bulk of the liquified methane and natural gas, and passing the gaseous gelling agent through the heated tube to thereby prevent the solidification of the gelling agent before it is disposed within the bulk.

16. A method according to claim 15 including the step of mixing the gaseous gelling agent with a carrier gas, and wherein the resulting mixture is injected into the liquid mass.

17. A method according to claim 16 wherein the carrier gas comprises helium.

18. A method according to claim 16 wherein the carrier gas comprises methane.

19. A method for storing and transporting a relatively large mass of at least one of methane and natural gas in ocean vessels or land bound storage tanks comprising the steps of cooling the mass sufficiently to form a body of at least one of liquified methane and liquified natural gas of an appropriately low temperature, providing a gelling agent selected from the class consisting of water and methyl alcohol, placing the gelling agent in its gaseous state, injecting a sufficient amount of the gaseous gelling agent directly into the liquid body to thereby cause the gelling agent to transform into its solid state while dispersing into finely divided, small particles, continuing the injecting step until a sufficient number of gelling agent particles are present in the liquid body to cause said body to gel, and thereafter storing or transporting the gelled liquid body, whereby movement of the gelled liquid body under transport motions is substantially reduced, and the gelled liquid body is prevented from dispersing into a large pool in the event of leakage or rupture of the tank or vessel to reduce both fire dangers and the pollutions of the surrounding atmosphere.

20. A method according to claim 19 including the step of terminating the injection of the gelling agent when the gelling agent is present in the liquid body in an amount of between about 0.1 percent to about 3.0 percent by weight of the liquid body.

* * * * *